(12) United States Patent
Liu

(10) Patent No.: US 7,295,452 B1
(45) Date of Patent: Nov. 13, 2007

(54) ACTIVE POWER FACTOR CORRECTION CIRCUIT AND CONTROL METHOD THEREOF

(75) Inventor: Kwang-Hwa Liu, Sunnyvale, CA (US)

(73) Assignee: Green Mark Technology Inc., Tao-Yuan County (TW)

( * ) Notice: Subject to any disclaimer, the term of this patent is extended or adjusted under 35 U.S.C. 154(b) by 0 days.

(21) Appl. No.: 11/470,629

(22) Filed: Sep. 7, 2006

(51) Int. Cl.
 *H02M 5/42* (2006.01)
 *G05F 1/10* (2006.01)

(52) U.S. Cl. .................. 363/82; 323/235; 323/240; 323/284

(58) Field of Classification Search ............. 363/39, 363/45–48, 89, 90, 82; 323/222, 235–244, 323/282–285, 290
See application file for complete search history.

(56) References Cited

U.S. PATENT DOCUMENTS 5,001,620 A * 3/1991 Smith ...................... 363/89
5,367,247 A   11/1994 Blocher et al.
5,737,204 A * 4/1998 Brown ..................... 363/89
5,757,166 A   5/1998 Sodhi

* cited by examiner

*Primary Examiner*—Jessica Han
(74) *Attorney, Agent, or Firm*—Jianq Chyun IP Office

(57) ABSTRACT

An active power factor correction (PFC) circuit and its controlling method are provided. The method comprises the following steps. Drive the power switch of the circuit so that the average inductor current waveform follows the rectified input voltage waveform. Suspend the operation of the power switch at a first moment in a first line cycle of the rectified input voltage and then resume the operation of the power switch at a second moment in a second line cycle of the rectified input voltage. The first moment is when the phase angle of the rectified input voltage exceeds a predetermined angle and the switching frequency of the power switch exceeds a predetermined frequency. The time span from the first moment to the end of the first line cycle is substantially as long as the time span from the beginning of the second line cycle to the second moment.

18 Claims, 7 Drawing Sheets

ACTIVE POWER FACTOR CORRECTION CIRCUIT AND CONTROL METHOD THEREOF

BACKGROUND OF THE INVENTION

1. Field of the Invention

The present invention relates to active power factor correction (PFC). More particularly, the present invention relates to critical mode (CRM) active power factor correction.

2. Description of the Related Art

Most active PFC circuits are based on a boost converter topology. Its main power switch is typically a high-voltage power metal oxide semiconductor field effect transistor (MOSFET) operating at high switching frequency (normally higher than the audible frequency limit of 20 kHz) such that the circuit size can be reduced. There are three major types of active PFC circuits. The first type is continuous current mode (CCM) PFC. The second type is discontinuous current mode (DCM) PFC. The third type is critical mode (CRM) PFC.

FIG. 1A is a schematic diagram showing a conventional CCM PFC circuit 100. Circuit 100 comprises a bridge rectifier DR1-DR4 to rectify the alternating current (AC) line input voltage Vin. The rest of circuit 100 is a boost converter. Circuit 100 operates at a constant switching frequency. The control circuit of power MOSFET Q1 modulates the AC line input current (which is equal to the current through the input inductor L1) such that its waveform follows the rectified sinusoidal AC line input voltage waveform, thereby correcting the power factor.

FIG. 2A is a plot of the current through input inductor L1 versus time. The input inductor current 211 is continuous. It only drops to zero at phase angles of 0° and 180° of the rectified line cycle (typically at 100 Hz or 120 Hz). During each switching cycle of MOSFET Q1, for example, the cycle from T1 to T3, MOSFET Q1 is turned on in the shaded area and is turned off in the non-shaded area. When Q1 is turned on, inductor current 211 rises up. When Q1 is turned off, inductor current 211 falls down. Circuit 100 arranges the relative lengths of the turn-on and turn-off periods of MOSFET Q1 such that the zig-zag waveform of inductor current 211 approximates a sinusoidal waveform which follows the rectified AC input voltage Vin. As shown in FIG. 2A, the average inductor current of circuit 100 is Ipk*sin(α), wherein Ipk is the peak inductor current and α is the phase angle of the rectified line cycle.

For modulating the inductor current, a flip-flop 106 drives MOSFET Q1. Clock signal CLK sets the output of flip-flop 106 to turn on MOSFET Q1 at the beginning of each switching cycle. On the other hand, pulse width modulator PWM resets the output of flip-flop 106 to turn off MOSFET Q1 in each switching cycle. Pulse width modulator PWM compares the output of current sense amplifier 101 and multiplier 104. Multiplier 104 receives three input signals. The first input signal a is a fraction of the rectified AC line input voltage. The second input signal b is the square of input signal a provided by V-square calculator 103. The third input signal c comes from feedback error amplifier 107 and is the amplified difference between reference voltage VREF and a fraction of output voltage Vout. Multiplier 104 outputs a sinewave reference signal Vsin. As shown in FIG. 1A, Vsin=(a*c/b). Sinewave reference signal Vsin represents the upper limit of the inductor current in each switching cycle of MOSFET Q1. When the output of current sense amplifier 101 exceeds sinewave reference signal Vsin, pulse width modulator PWM resets the output of flip-flop 106 to turn off power MOSFET Q1.

The conduction loss of power MOSFET Q1 is minimized since a CCM PFC circuit has the lowest root-mean-square (RMS) current value among all active PFC circuits based on a boost converter. Nevertheless, a CCM PFC circuit suffers from high switching loss due to the slow reverse recovery of the output rectifier diode. In general, the switching loss associated with the recovery time of the output diode is 2% or more of the rated output power.

Further, a CCM PFC circuit has significant switching loss associated with the output capacitance of the power MOSFET. Since the inductor current is continuous, the MOSFET turns on when the output diode is conducting current, and the drain-to-source voltage is at 400V level. The switching loss associated with the MOSFET output capacitance can be as much as 2% of the rated output power. In addition, the reverse recovery of the output diode and the turn-on of the power MOSFET at a high drain-to-source voltage level often lead to severe electromagnetic interference (EMI) issues.

The second major type of PFC is DCM PFC. FIG. 2B is a plot of the inductor current 221 of a typical DCM PFC circuit versus time. DCM PFC operates at constant switching frequency. DCM PFC has no diode reverse recovery issue because the power MOSFET switch always turns on when inductor current 221 is zero. The average inductor current in FIG. 2B is less than 0.5*Ipk*sin(α) due to the dead time from the time the inductor current drops to zero (at T3, T6, T9, etc.) to the time the power switch turns on again (at T4, T7, T10, etc.).

DCM PFC has higher conduction loss than the CCM PFC due to its triangular inductor current waveform. Another issue of DCM PFC is higher order (third order and above) harmonic distortion at light load, especially at high line conditions. The dead time of inductor current 221 accounts for the input current waveform distortion and high-order harmonics.

The third major type of PFC is CRM PFC. FIG. 1B is a schematic diagram showing a conventional CRM PFC circuit 150. FIG. 2C is a plot of the inductor current 231 of CRM PFC circuit 150 versus time. Similar to a DCM PFC circuit, a CRM PFC circuit is a zero-current switching boost converter. The power MOSFET Q1 turns on at zero diode current. Therefore, it eliminates the diode reverse recovery issue. The difference between CRM and DCM is that power MOSFET Q1 of CRM PFC circuit 150 turns on as soon as the current through output diode D1 drops to zero, as shown in FIG. 2C. Whereas, in a DCM PFC circuit, there is a delay time from the time when the output diode current drops to zero to the time the MOSFET turns on. The average inductor current of circuit 150 is 0.5*Ipk*sin(α).

The controlling of power MOSFET Q1 in circuit 150 is similar to that in circuit 100. When the current through output diode D1 drops to zero, the output of zero current detector 111 sets the output of flip-flop 106 to turn on power MOSFET Q1. Sinewave reference signal Vsr provided by multiplier 112 represents the upper limit of inductor current 231. The signal from sensor resistor RSEN to pulse width modulator PWM is proportional to inductor current 231. When the signal from RSEN exceeds sinewave reference signal Vsr, pulse width modulator PWM resets the output of flip-flop 106 to turn off power MOSFET Q1.

CRM PFC does not operate at a constant frequency. Its switching frequency is always higher at both sides of the line cycle (near 0° and 180°) than in the middle of the line cycle (near 90°). At no load or light load conditions, the switching quickens because of small inductor current, therefore increasing switching loss. Such switching loss may overwhelm the output power at light load conditions due to very high switching frequency. In another word, the power efficiency of a CRM PFC circuit is significantly lower at light load conditions. At the present time power supply units of personal computers may be required to conform to the green mode standard. That is, the power consumption of a power supply unit at no load conditions must be lower than a certain threshold, for example, 0.5 W. A high switching loss is undesirable.

SUMMARY OF THE INVENTION

Accordingly, the present invention is directed to an active PFC circuit and a corresponding method for controlling its power switch. This active PFC circuit is an improvement over a conventional CRM PFC circuit. It retains the advantages of no diode reverse recovery loss, and low higher-order harmonic distortion. In addition, the active PFC circuit of the present invention inhibits the power MOSFET from switching above a predetermined upper frequency limit. It is capable of reducing switching loss and switching noise in light load and no load conditions. Consequently this active PFC circuit is compatible with green mode power supply standards.

According to an embodiment of the present invention, an active power factor correction circuit is provided. The active PFC circuit comprises a bridge rectifier for receiving an AC input voltage and providing a rectified input voltage, an input inductor coupled to the bridge rectifier, a power switch coupled between the input inductor and a ground, an output diode coupled to the input inductor and the power switch, an output capacitor coupled between the output diode and the ground, and a control circuit.

In the embodiment above, the control circuit drives the power switch so that the phase angle of the average current through the input inductor is substantially the same as the phase angle of the rectified input voltage. The control circuit suspends the operation of the power switch at a first moment in a first line cycle of the rectified input voltage and then the control circuit resumes the operation of the power switch at a second moment in a second line cycle of the rectified input voltage. The first moment is when the phase angle of the rectified input voltage exceeds a predetermined angle and the switching frequency of the power switch exceeds a predetermined frequency. The time span from the first moment to the end of the first line cycle is substantially as long as the time span from the beginning of the second line cycle to the second moment.

According to another embodiment of the present invention, a method for controlling the active PFC circuit above is provided. The method comprises the following steps. Drive the power switch so that the phase angle of the average current through the input inductor is substantially the same as the phase angle of the rectified input voltage. Suspend the operation of the power switch at a first moment in a first line cycle of the rectified input voltage and then resume the operation of the power switch at a second moment in a second line cycle of the rectified input voltage. The first moment is when the phase angle of the rectified input voltage exceeds a predetermined angle and the switching frequency of the power switch exceeds a predetermined frequency. The time span from the first moment to the end of the first line cycle is substantially as long as the time span from the beginning of the second line cycle to the second moment.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
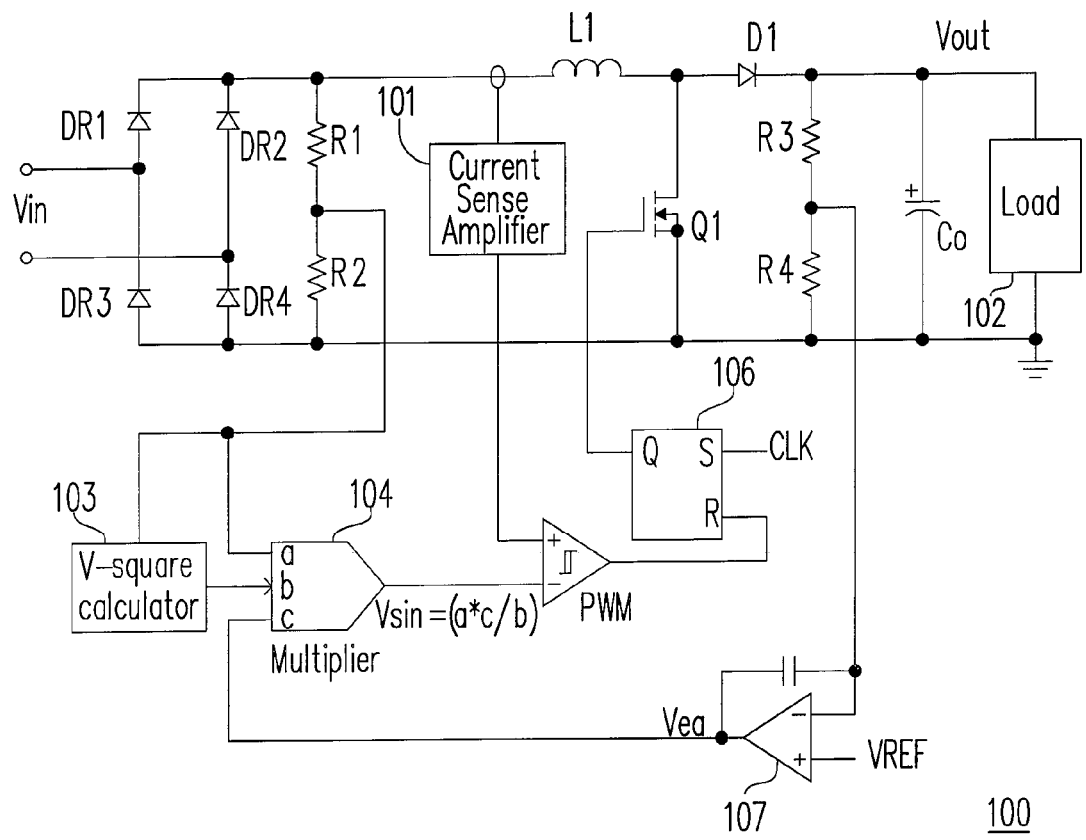
FIG. 1A is a schematic diagram showing a conventional CCM PFC circuit based on a boost converter.

Reference will now be made in detail to the present preferred embodiments of the invention, examples of which are illustrated in the accompanying drawings. Wherever possible, the same reference numbers are used in the drawings and the description to refer to the same or like parts.

Figure 3A:
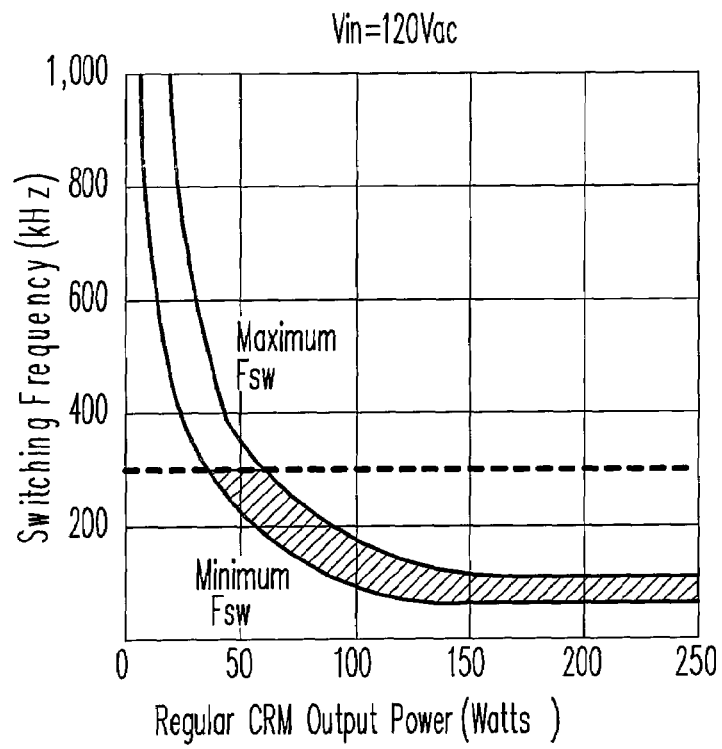
FIGS. 3A and 3B are schematic diagrams showing the switching frequency range of typical CRM PFC and the switching frequency range of an embodiment of the present invention.
Figure 3B:
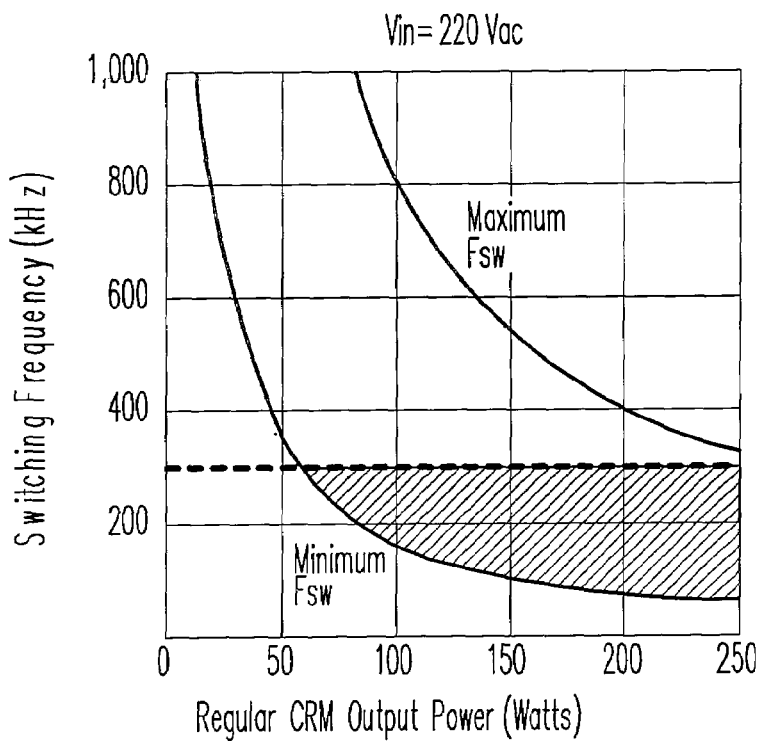

FIGS. 3A and 3B are schematic diagrams showing switching frequency ranges of typical CRM PFC circuits at different load conditions. FIG. 3A depicts the switching frequency ranges when the AC line input voltage Vin is 120V. FIG. 3B depicts the switching frequency ranges when the AC line input voltage Vin is 220V. There are two curves in each of FIGS. 3A and 3B. The lower curve shows the minimum switching frequency at different load conditions, while the upper curve shows the maximum switching frequency at different load conditions.

As shown in FIGS. 3A and 3B, the main drawback of conventional CRM PFC is that switching frequency can get very high, especially at light load and high line voltage conditions. The present invention improves conventional CRM PFC via a conduction angle modulation scheme to prevent the PFC circuit from operating at high frequency. For example, an embodiment of the present invention inhibits the power switch of the PFC circuit from switching frequencies above 300 kHz, as indicated by the dashed horizontal lines in FIGS. 3A and 3B. By operating in the shaded areas below the 300 kHz line, this embodiment can reduce switching loss and switching noises at light load conditions. Consequently, this embodiment is compatible with the green mode standards.

Figure 4:
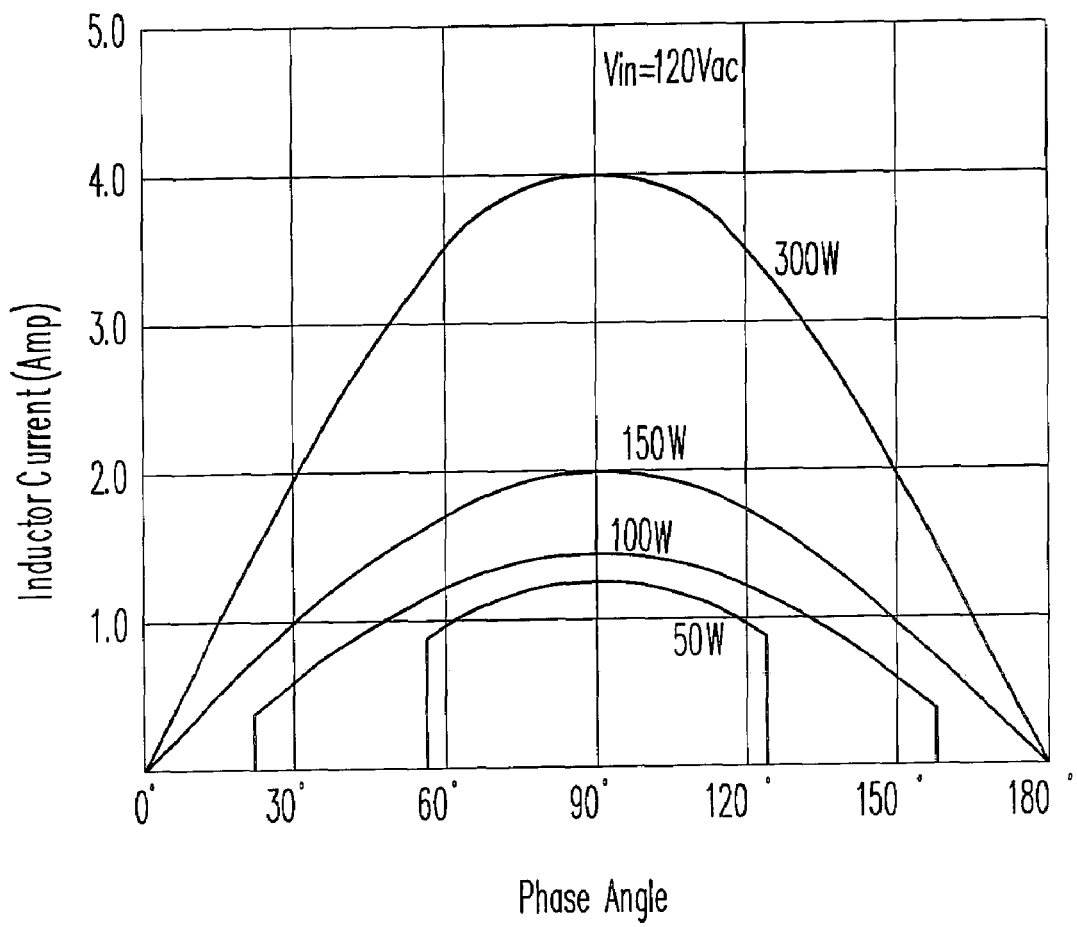
FIG. 4 is a schematic diagram showing the average inductor current waveforms at different load conditions according to an embodiment of the present invention.

FIG. 4 is a schematic diagram showing the average inductor current waveforms of this embodiment at different load conditions when the AC input voltage Vin is 120V. At heavy load conditions (300 W and 150 W) the switching frequency does not exceed 300 kHz. The operation of the power switch is not inhibited and the waveforms are the same as those of the CRM PFC. The phase angle of the average inductor current is substantially the same as the phase angle of the rectified input voltage. At light load conditions (100 W and 50 W) the switching frequency exceeds 300 kHz near both ends of the line cycle. In this case the operation of the power switch is suspended and the inductor current stops accordingly, therefore the current waveforms are truncated at both ends.

Figure 5:
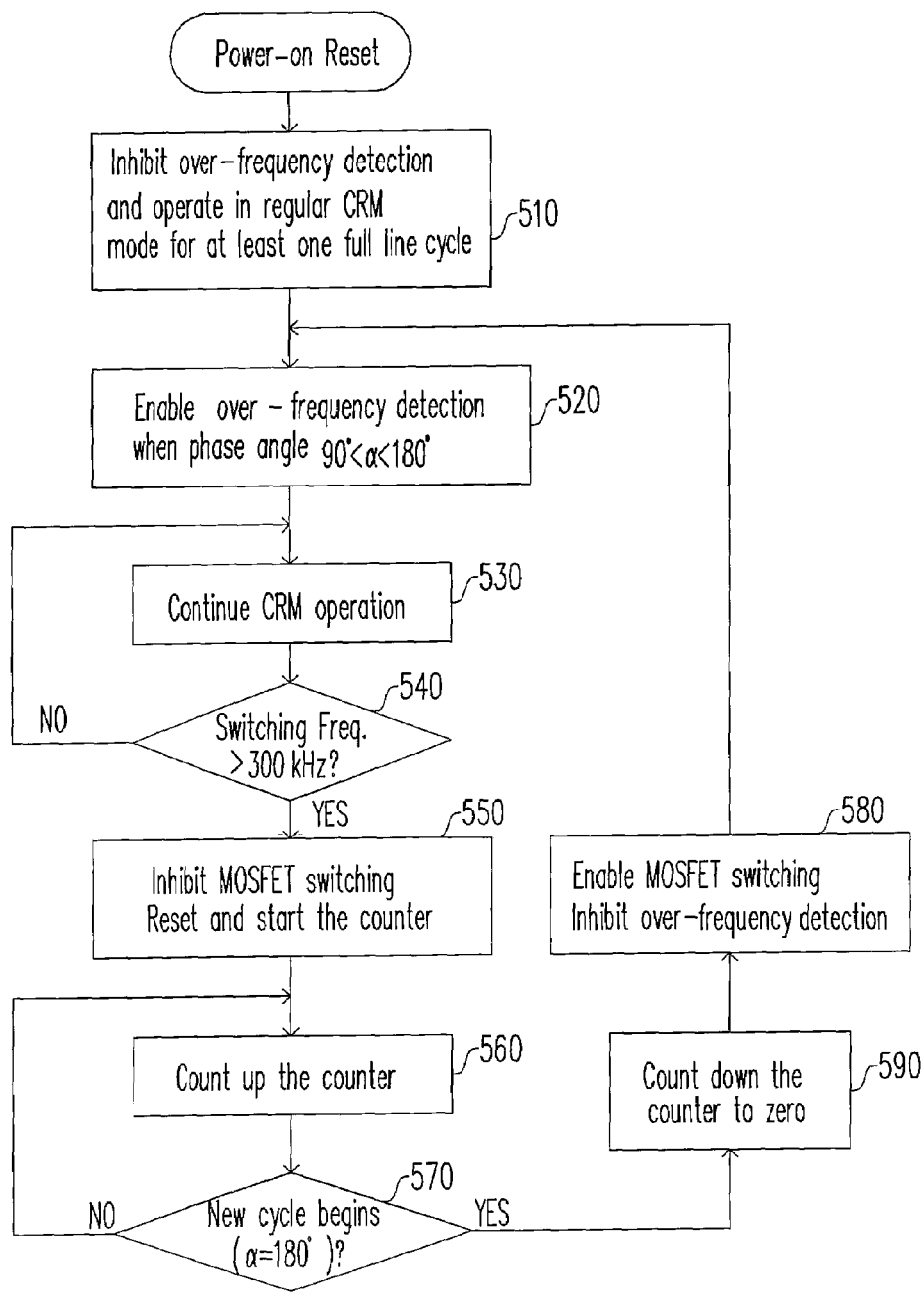
FIG. 5 is the flow chart of a method for controlling an active CRM PFC circuit according to an embodiment of the present invention.
Figure 6:
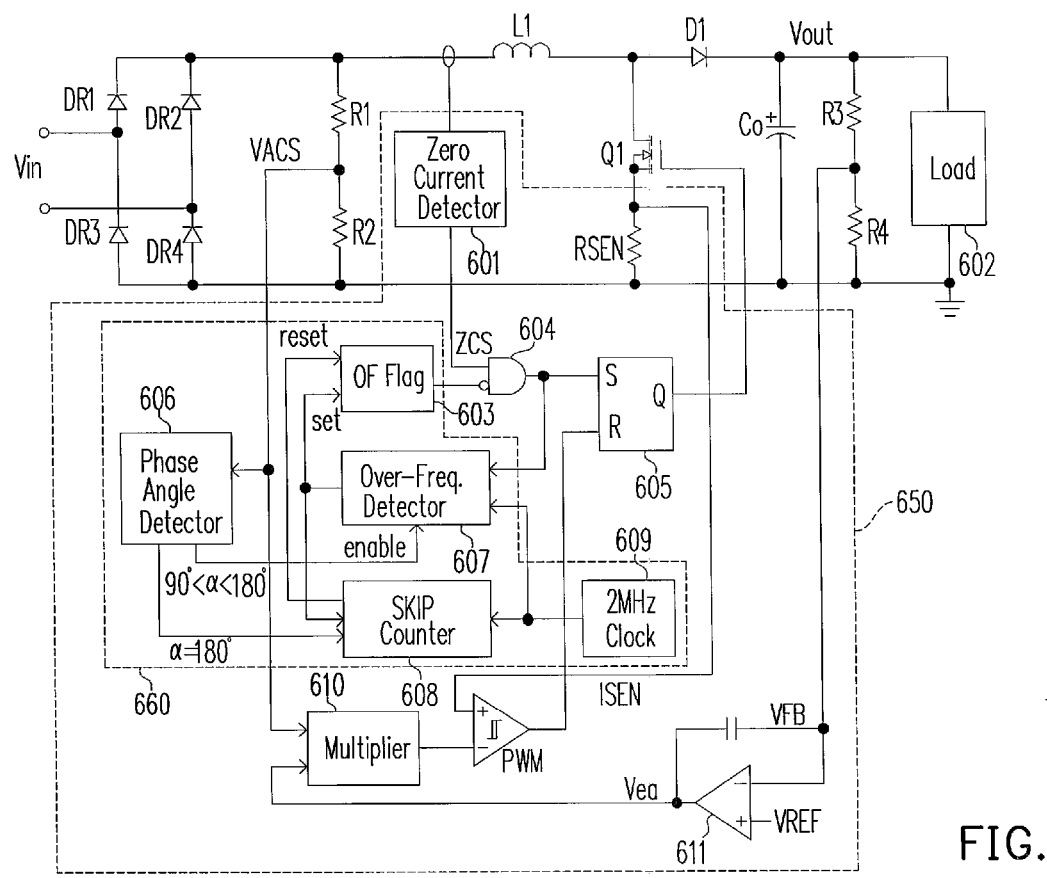
FIG. 6 is a schematic diagram showing an active PFC circuit according to an embodiment of the present invention.

FIG. 5 is the flow chart of a method for controlling an active PFC circuit according to this embodiment. FIG. 6 is a schematic diagram showing the improved PFC circuit 600 according to this embodiment. Please refer to FIG. 5 and FIG. 6 for the descriptions below.

The major elements of PFC circuit 600 comprise a bridge rectifier DR1-DR4, an input inductor L1 coupled to bridge rectifier DR1-DR4, a power switch Q1 coupled between input inductor L1 and the ground, an output diode D1 coupled to input inductor L1 and power switch Q1, an output capacitor Co coupled between output diode D1 and the ground, and a control circuit 650. Bridge rectifier DR1-DR4 receives an AC input voltage Vin and provides a rectified input voltage. Power switch Q1 is a MOSFET in this embodiment.

Control circuit 650 comprises a driver flip-flop 605, a setting circuit and a resetting circuit. The setting circuit comprises zero current detector 601, logic circuit 604 and over-frequency (OF) circuit 660. The major elements of the resetting circuit comprise multiplier 610, pulse width modulator PWM and feedback error amplifier 611. Driver flip-flop 605 turns on power switch Q1 upon receiving a setting signal provided by the setting circuit and turns off power switch Q1 upon receiving a resetting signal provided by the resetting circuit. OF circuit 660 comprises OF flip-flop 603, phase angle detector 606, OF detector 607, skip counter 608 and high-frequency clock 609. The elements mentioned above will be discussed in details below.

The flow in FIG. 5 begins at step 510. To confine the switching frequency within the green standard limit, this embodiment monitors the switching frequency and suspends the operation of the power switch when the switching frequency exceeds the predetermined threshold (300 kHz in this embodiment). This can be done only when the phase angle α of the rectified input voltage is greater than 90°, where the switching frequency starts to increase. Therefore this embodiment must inhibit OF detection and operate in regular CRM for at least one full line cycle in order to catch the moment when the phase angle α exceeds 90°. In this waiting period the operation of the power switch is neither suspended nor resumed. The switching just continues as in regular CRM. Step 510 may be implemented by phase angle detector 606. As disclosed below, phase angle detector 606 controls OF detector 607 and skip counter 608. There is no OF detection as long as phase angle detector 606 disables OF detector 607 and skip counter 608.

And then the flow in FIG. 5 proceeds to step 520. The switching frequency gradually increases when the phase angle α is between 90° and 180°. The voltage-divider consisting of resistors R1 and R2 provides a predetermined fraction of the rectified AC input voltage (VACS) to phase angle detector 606 so that phase angle detector 606 can calculate the phase angle of the rectified input voltage. Phase angle detector 606 enables OF detector 607 when the phase angle reaches 90° and disables the OF detector when the phase angle reaches 180°. OF detector 607 calculates the switching frequency and detects the OF condition when enabled.

In step 530, since OF detection is not enabled yet, circuit 600 continues its regular CRM operation. OF circuit 660 stores an OF flag in OF flip-flop 603. The setting of the OF flag means that the switching frequency has exceeded the predetermined threshold of 300 kHz. During regular CRM operation the OF flag is not set and OF flip-flop 603 outputs logic 0.

Zero current detector 601 monitors the inductor current and provides a zero current signal ZCS when the current through input inductor L1 is about zero. Logic circuit 604 receives the zero current signal ZCS and the output of OF flip-flop 603. As shown in FIG. 6, logic circuit 604 comprises an inverter and an AND gate. The inverter receives the output of OF flip-flop 603. The AND gate receives zero current signal ZCS and the output of the inverter and provides the setting signal to driver flip-flop 605. Since the output of OF flip-flop 603 is logic 0 during regular CRM operation, logic circuit 604 just outputs zero current signal ZCS as the setting signal. Whenever the inductor current falls to zero, zero current signal ZCS sets the output of driver flip-flop 605 to turn on the power switch Q1.

Figure 1B:
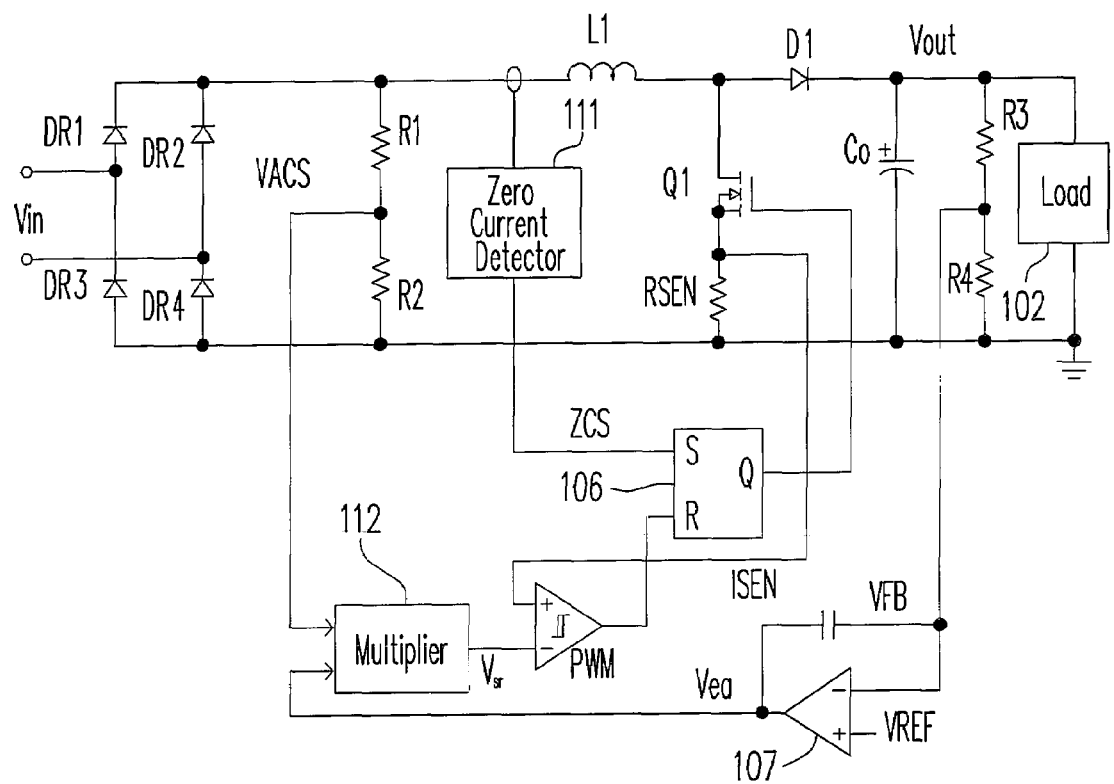
FIG. 1B is a schematic diagram showing a conventional CRM PFC circuit based on a boost converter.
Figure 2A:
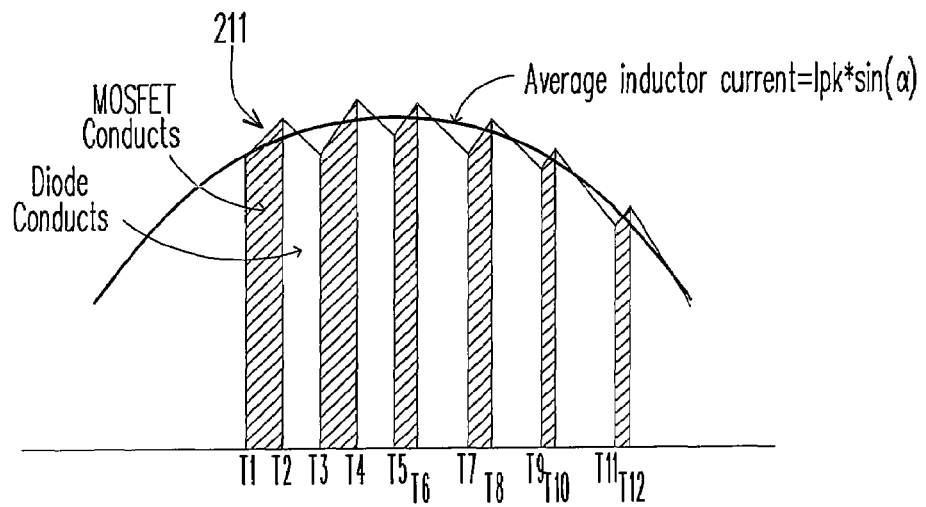
FIG. 2A is a schematic plot showing a typical inductor current waveform of a CCM PFC circuit.
Figure 2B:
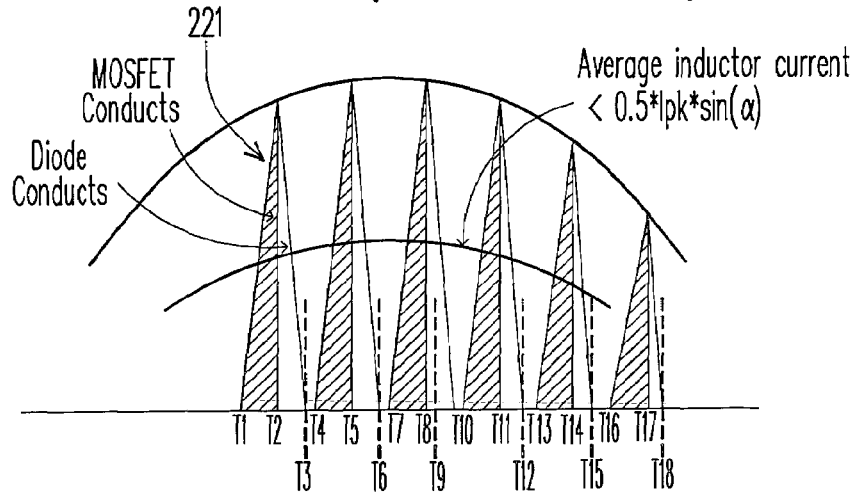
FIG. 2B is a schematic plot showing a typical inductor current waveform of a DCM PFC circuit.
Figure 2C:
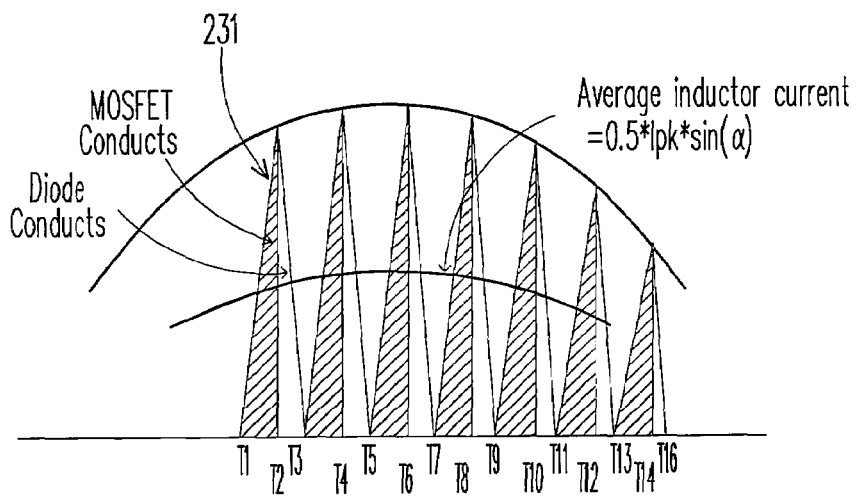
FIG. 2C is a schematic plot showing a typical inductor current waveform of a CRM PFC circuit.

The major elements of the resetting circuit, namely multiplier 610, pulse width modulator PWM and feedback error amplifier 611, work in a way similar to its counterpart in FIG. 1B. Feedback error amplifier 611 amplifies the difference between a reference voltage VREF and at least a fraction of output voltage Vout across output capacitor Co and outputs the amplified difference Vea. The voltage divider consisting of resistors R3 and R4 provides the predetermined fraction of output voltage Vout to feedback error amplifier 611. Multiplier 610 provides a sinewave reference signal Vsr according to the output Vea of feedback error amplifier 611 and at least a fraction of the rectified input voltage. The voltage divider consisting of resistors R1 and R2 provides the predetermined fraction VACS of the rectified input voltage to multiplier 610. Pulse width modulator PWM provides the resetting signal according to the comparison result between sinewave reference signal Vsr and a signal ISEN proportional to the inductor current. Sensor resistor RSEN is coupled between power switch Q1 and the ground. Sensor resistor RSEN provides signal ISEN to pulse width modulator PWM. Sinewave reference signal Vsr represents the upper limit of the inductor current in each switching cycle of power switch Q1. When signal ISEN exceeds sinewave reference signal Vsr, pulse width modulator PWM outputs the resetting signal to reset the output of driver flip-flop 605 in order to turn off power switch Q1.

In step 540, OF detector 607 checks whether the switching frequency of power switch Q1 exceeds 300 kHz. When enabled, OF detector 607 calculates the switching frequency according to the setting signal provided by logic circuit 604. Clock 609 provides a high-frequency clock signal to DF detector 607. DF detector 607 calculates the switching frequency by calculating the number of cycles of the clock signal between two consecutive setting signals from logic circuit 604. Therefore DF detector 607 can monitor the time span of each switching cycle of power switch Q1 and the switching frequency can be derived from the length of the switching cycle. For accurate calculation, it is preferred to use a clock signal whose frequency is much higher than the switching frequency. For example, the clock signal in this embodiment has a frequency of 2 MHz. If the switching frequency is less than 300 kHz, the flow returns to step 530. If the switching frequency exceeds 300 kHz due to a light load or a high line input voltage condition, the flow proceeds to step 550.

In step 550, OF detector 607 sets the OF flag stored in OF flip-flop 603. Once the OF flag is set, the output of OF flip-flop 603 becomes logic 1, thus inhibiting zero current signal ZCS from reaching driver flip-flop 605. The blocking of zero current signal ZCS in logic circuit 604 stops MOSFET Q1 from further switching. At the same time, skip counter 608 starts counting up from zero when OF detector 607 sets the OF flag.

And then the flow proceeds to step 560, wherein skip counter 608 continues counting up in response to the clock signal provided by clock 609.

And then the flow proceeds to step 570. Phase angle detector 606 checks whether the phase angle α of the rectified input voltage has reached 180°. A phase angle less than 180° means the current line cycle is not finished yet. The flow returns to step 560 to count up skip counter 608. On the other hand, a phase angle equal to 180° means the end of the current line cycle and the beginning of the next line cycle. In this case, phase angle detector 606 disables OF detector 607 and notifies skip counter 608 to start counting down, and then the flow proceeds to step 590.

In step 590, skip counter 608 counts down in response to the clock signal provided by clock 609. When skip counter 608 counts down to zero, the flow proceeds to step 580. Skip counter 608 starts to count up from zero when the OF flag is set and then starts to count down at the beginning of the next line cycle. The purpose of such a design is to predict the moment in the next line cycle when the operation of power switch Q1 should be resumed. Given constant clock frequency, the time span from the moment when the OF flag is set to the end of the present line cycle is substantially as long as the time span from the beginning of the next line cycle to the moment when the operation of power switch Q1 is resumed. Since the switching frequency is symmetric in each line cycle, the switching frequency is expected to be under the 300 kHz threshold after the switching of Q1 is resumed.

In step 580, skip counter 608 counts down to zero and resets the OF flag stored in OF flip-flop 603. Once the OF flag is reset, the output of OF flip-flop 603 becomes logic 0. Logic circuit 604 outputs zero current signal ZCS as the setting signal to driver flip-flop 605, thus resuming the operation of power switch Q1. And then the flow returns to step 520 to enable over-frequency detection for the next line cycle.

In summary, the active PFC circuit in this embodiment is an improvement over conventional CRM PFC. It retains the advantages of no diode reverse recovery loss, and low higher-order harmonic distortion. Moreover, the active PFC circuit of this embodiment inhibits the power MOSFET from switching above a predetermined upper frequency limit. It is capable of reducing switching loss and switching noise in light load and no load conditions. Consequently this active PFC circuit is compatible with green mode power supply standards.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An active power factor correction (PFC) circuit, comprising:
   a bridge rectifier for receiving an alternating current (AC) input voltage and providing a rectified input voltage;
   an input inductor coupled to the bridge rectifier;
   a power switch coupled between the input inductor and a ground;
   an output diode coupled to the input inductor and the power switch;
   an output capacitor coupled between the output diode and the ground; and
   a control circuit for driving the power switch so that the phase angle of the average current through the input inductor is substantially the same as the phase angle of the rectified input voltage, wherein the control circuit suspends the operation of the power switch at a first moment in a first line cycle of the rectified input voltage and then the control circuit resumes the operation of the power switch at a second moment in a second line cycle of the rectified input voltage, the first moment is when the phase angle of the rectified input voltage exceeds a predetermined angle and the switching frequency of the power switch exceeds a predetermined frequency, the time span from the first moment to the end of the first line cycle is substantially as long as the time span from the beginning of the second line cycle to the second moment.

2. The active PFC circuit of claim 1, wherein the predetermined angle is about 90 degree and the predetermined frequency is about 300 kHz.

3. The active PFC circuit of claim 1, wherein the control circuit comprises:
   a driver flip-flop for turning on the power switch upon receiving a setting signal and for turning off the power switch upon receiving a resetting signal;
   a setting circuit for providing the setting signal; and
   a resetting circuit for providing the resetting signal.

4. The active PFC circuit of claim 3, wherein the setting circuit comprises:
   a zero current detector for providing a zero current signal when the current through the input inductor is about zero;
   an over-frequency (OF) circuit for storing an OF flag, wherein the OF flag is set at the first moment and is reset at the second moment; and
   a logic circuit for providing the setting signal according to the zero current signal and the OF flag.

5. The active PFC circuit of claim 4, wherein the OF circuit comprises:
   an OF flip-flop for storing the OF flag;
   an OF detector enabled or disabled according to the phase angle of the rectified input voltage, wherein, when enabled, the OF detector calculates the switching frequency of the power switch according to the setting signal and sets the OF flag when the switching frequency exceeds the predetermined frequency; and
   a skip counter for starting counting up from zero when the OF detector sets the OF flag, starting counting down when the phase angle of the rectified input voltage reaches 180 degree, and resetting the OF flag when counting down to zero.

6. The active PFC circuit of claim 5, wherein the logic circuit comprises:
   an inverter for receiving a signal representing the state of the OF flag from the OF flip-flop; and an AND gate for receiving the zero current signal and the output of the inverter and providing the setting signal.

7. The active PFC circuit of claim 5, wherein the OF circuit further comprises:
a phase angle detector for calculating the phase angle of the rectified input voltage, enabling the OF detector when the phase angle reaches the predetermined angle, disabling the OF detector when the phase angle reaches 180 degree, and notifying the skip counter to start counting down when the phase angle reaches 180 degree.

8. The active PFC circuit of claim 5, wherein the OF circuit further comprises:
a clock for providing a clock signal; wherein
the DF detector calculates the switching frequency of the power switch by calculating the number of cycles of the clock signal between two consecutive setting signals from the logic circuit;
the skip counter counts up and counts down in response to the clock signal.

9. The active PFC circuit of claim 3, wherein the resetting circuit comprises:
a feedback error amplifier for amplifying the difference between a reference voltage and at least a fraction of the voltage across the output capacitor, and outputting the amplified difference;
a multiplier for providing a sinewave reference signal according to the output of the feedback error amplifier and at least a fraction of the rectified input voltage; and
a pulse width modulator for providing the resetting signal according to the comparison result between the sinewave reference signal and a signal derived from the current through the input inductor.

10. The active PFC circuit of claim 9, further comprising:
a sensor resistor coupled between the power switch and the ground for providing the signal derived from the current through the input inductor to the pulse width modulator.

11. A method for controlling an active PFC circuit, wherein the active PFC circuit comprises a bridge rectifier for receiving an AC input voltage and providing a rectified input voltage, an input inductor coupled to the bridge rectifier, a power switch coupled between the input inductor and a ground, an output diode coupled to the input inductor and the power switch, and an output capacitor coupled between the output diode and the ground, the method comprises:
driving the power switch so that the phase angle of the average current through the input inductor is substantially the same as the phase angle of the rectified input voltage;
suspending the operation of the power switch at a first moment in a first line cycle of the rectified input voltage; and
resuming the operation of the power switch at a second moment in a second line cycle of the rectified input voltage;
wherein the first moment is when the phase angle of the rectified input voltage exceeds a predetermined angle and the switching frequency of the power switch exceeds a predetermined frequency, the time span from the first moment to the end of the first line cycle is substantially as long as the time span from the beginning of the second line cycle to the second moment.

12. The method of claim 11, wherein the predetermined angle is about 90 degree and the predetermined frequency is about 300 kHz.

13. The method of claim 11, further comprising:
turning on the power switch upon receiving a setting signal; and
turning off the power switch upon receiving a resetting signal.

14. The method of claim 13, further comprising:
providing a zero current signal when the current through the input inductor is about zero;
storing an OF flag, wherein the OF flag is set at the first moment and is reset at the second moment; and
providing the setting signal according to the zero current signal and the OF flag.

15. The method of claim 14, further comprising:
when the phase angle of the rectified input voltage is between the predetermined angle and 180 degree, calculating the switching frequency of the power switch according to the setting signal and setting the OF flag when the switching frequency exceeds the predetermined frequency;
starting counting up from zero when the OF flag is set;
starting counting down from the result of the counting up when the phase angle of the rectified input voltage reaches 180 degree; and
resetting the OF flag when the counting down reaches zero.

16. The method of claim 15, further comprising:
calculating the switching frequency of the power switch by calculating the number of cycles of a clock signal between two consecutive setting signals; and
performing the counting up and the counting down in response to the clock signal.

17. The method of claim 13, further comprising:
amplifying the difference between a reference voltage and at least a fraction of the voltage across the output capacitor;
providing a sinewave reference signal according to the amplified difference and at least a fraction of the rectified input voltage; and
providing the resetting signal according to the comparison result between the sinewave reference signal and a signal derived from the current through the input inductor.

18. The method of claim 11, further comprising:
inhibiting the suspending and the resuming of the operation of the power switch for at least one full line cycle of the rectified input voltage.

* * * * *